United States Patent
Fox et al.

(10) Patent No.: US 6,875,346 B2
(45) Date of Patent: Apr. 5, 2005

(54) FILTER

(76) Inventors: Diane N. Fox, 11602 Sugar Ridge Rd., Bowling Green, OH (US) 43402; Matthew A. Fox, 11602 Sugar Ridge Rd., Bowling Green, OH (US) 43402

( * ) Notice: Subject to any disclaimer, the term of this patent is extended or adjusted under 35 U.S.C. 154(b) by 30 days.

(21) Appl. No.: 10/328,999

(22) Filed: Dec. 26, 2002

(65) Prior Publication Data

US 2004/0124127 A1 Jul. 1, 2004

(51) Int. Cl.[7] .......................... B01D 29/21; B01D 29/58
(52) U.S. Cl. ..................... 210/169; 210/232; 210/315; 210/484; 210/489; 210/493.1
(58) Field of Search ............................ 210/169, 232, 210/314, 315, 483, 484, 488, 489, 493.1, 493.5

(56) References Cited

U.S. PATENT DOCUMENTS

| | | | | |
|---|---|---|---|---|
| 2,453,952 A | * | 11/1948 | White | 210/458 |
| 2,463,137 A | * | 3/1949 | Bahlke | 210/301 |
| 2,907,466 A | * | 10/1959 | Beddow | 210/457 |
| 3,306,794 A | * | 2/1967 | Humbert, Jr. | 156/69 |
| 3,348,695 A | * | 10/1967 | Rosaen | 210/489 |
| 3,432,997 A | * | 3/1969 | Baigue et al. | 55/367 |
| 3,498,464 A | * | 3/1970 | Enosolone | 210/457 |
| 3,708,965 A | * | 1/1973 | Domnick | 55/488 |
| 3,762,565 A | * | 10/1973 | Okuniewski et al. | 210/460 |
| 4,058,463 A | * | 11/1977 | Bartik | 210/317 |
| 4,211,543 A | * | 7/1980 | Tokar et al. | 55/485 |
| 4,647,373 A | * | 3/1987 | Tokar et al. | 210/232 |
| 4,816,161 A | * | 3/1989 | Olness et al. | 210/638 |
| 4,877,526 A | * | 10/1989 | Johnson et al. | 210/448 |
| 5,435,916 A | * | 7/1995 | Schwartz | 210/232 |
| 5,456,834 A | * | 10/1995 | Bowlsbey | 210/493.2 |
| 5,591,338 A | * | 1/1997 | Pruette et al. | 210/493.1 |
| 5,690,710 A | * | 11/1997 | Stephan | 55/366 |
| 5,873,920 A | * | 2/1999 | Wong et al. | 55/498 |

* cited by examiner

*Primary Examiner*—Fred G. Prince
(74) *Attorney, Agent, or Firm*—Allen D. Gutchess, Jr.

(57) ABSTRACT

A filter cartridge for filtering impurities and the like from a swimming pool or other body of water is provided. The filter cartridge is positioned in a receptacle for receiving water and for recirculating it back to the pool. The filter cartridge includes a core communicating with the recirculating system and having a plurality of openings therein communicating with a supporting frame located around the core and affixed thereto. The frame has a multiplicity of openings therein and a plurality of undulations extending therealong. A flexible sleeve is located around the frame and is of sufficient size to assume the contour of the frame when water is supplied from the exterior of the sleeve to the interior of the core, thereby providing a maximum filtering surface. The sleeve has elastic bands around both ends for drawing the ends together around the core beyond the ends of the frame. The sleeve can be easily removed for cleaning or replacement.

4 Claims, 3 Drawing Sheets

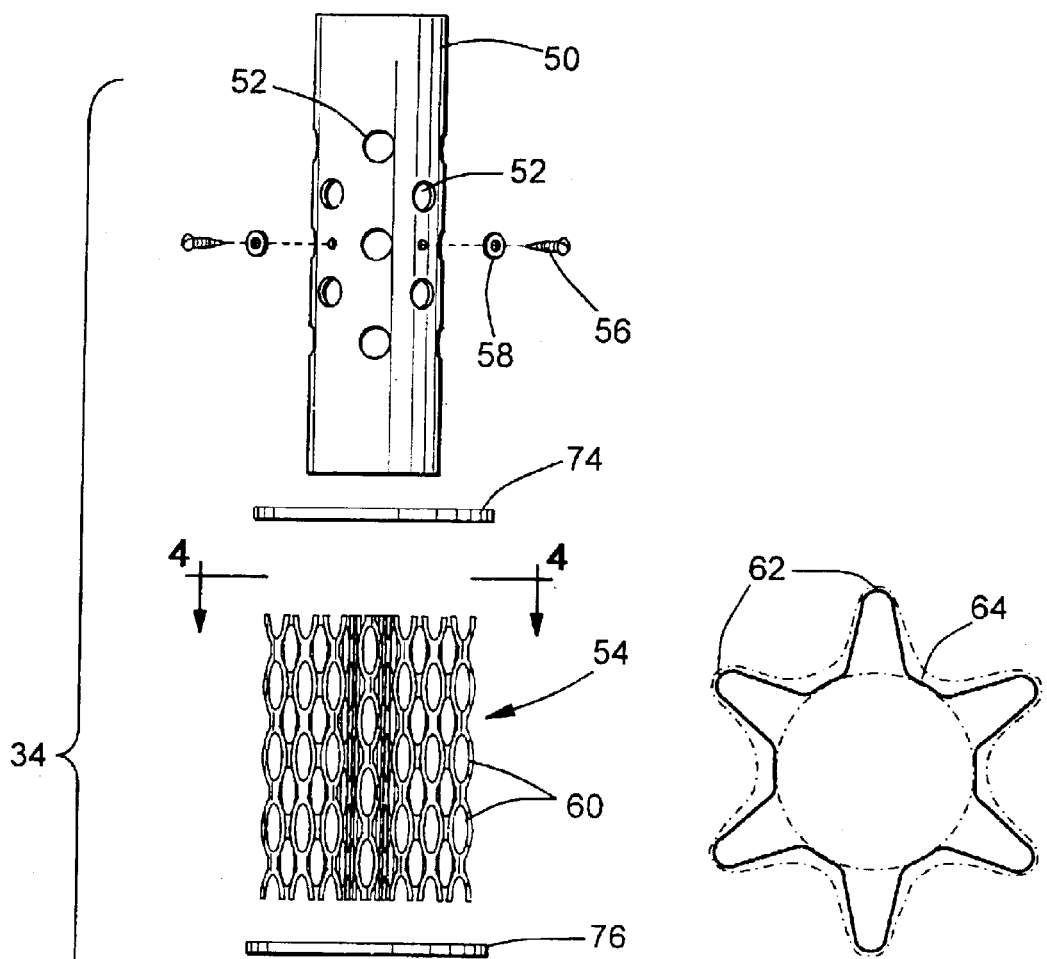
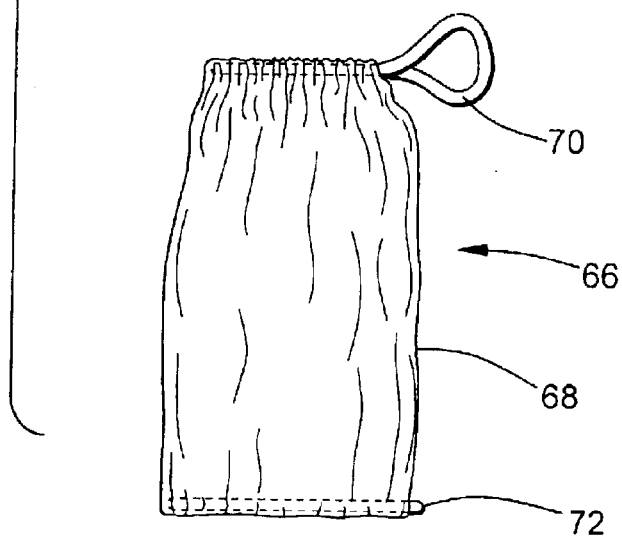
FIG. 3
FIG. 4

FILTER

This invention relates to a filter cartridge for filtering liquid recirculated from bodies of liquid, such as swimming pools.

The filter cartridge according to the invention includes a replaceable filter sleeve or tube which can be separated from the rest of the cartridge for ease in cleaning and replacement after periods of time. The filter sleeve can be of various materials or media according to the particular application or use. The sleeve is porous to enable passage of liquid therethrough and to entrap undesirable impurities.

The filter cartridge further includes a hollow core or member which can connect into a recirculating system that receives fluid, such as water, from the body. The hollow core has holes or openings through which water passes from a porous pleated frame or support which has a generally undulating contour, with the filter sleeve being located around the frame.

The filter sleeve has a width or diameter which exceeds the maximum dimension across the pleated support. The difference in dimensions is sufficient to enable the filter sleeve to assume the outer shape or contour of the support when the pressure of the water outside the sleeve exceeds the water pressure within the support and the core. This maximizes the filtering surface of the sleeve for a given size thereof.

The filter cartridge is located in a receptacle which receives water from the pool or body of water being filtered. The cartridge is removeably located in the container so that it can be taken out from time-to-time for replacement or cleaning of the filter sleeve. For this purpose, the sleeve has elastic bands at the open ends thereof, which bands are stretched around ends of the core to hold the sleeve in place around the core and the pleated frame. The bands can be pulled back over the ends of the core to separate the sleeve therefrom. After the sleeve is replaced or cleaned, it is assembled by being slipped over the frame, with the elastic bands then twisted and stretched over the ends of the core beyond ends of the frame. The assembly or filter cartridge can then be placed back in the receptacle with one end of the core communicating directly or indirectly with an intake of a recirculating pump and with the other end of the core simply being closed or capped off.

It is, therefore, a principal object of the invention to provide a filter cartridge which includes a pleated frame and an outer filtering sleeve around the frame, with the sleeve assuming the contour of the frame when liquid under pressure is supplied to the outside of the sleeve.

Another object of the invention is to provide a filter cartridge having a core and a frame with a replaceable filtering sleeve around the frame and attachable over ends of the core by elastic bands to facilitate removal of the sleeve.

Many other objects and advantages of the invention will be apparent from the following detailed description of a preferred embodiment thereof, reference being made to the accompanying drawings, in which:

FIG. 3 is an exploded view in elevation showing the filter cartridge components;

FIG. 4 is a somewhat schematic view taken along the line 4—4 of FIG. 3, showing the outer contour of a supporting frame of the filter cartridge.

Figure 1:
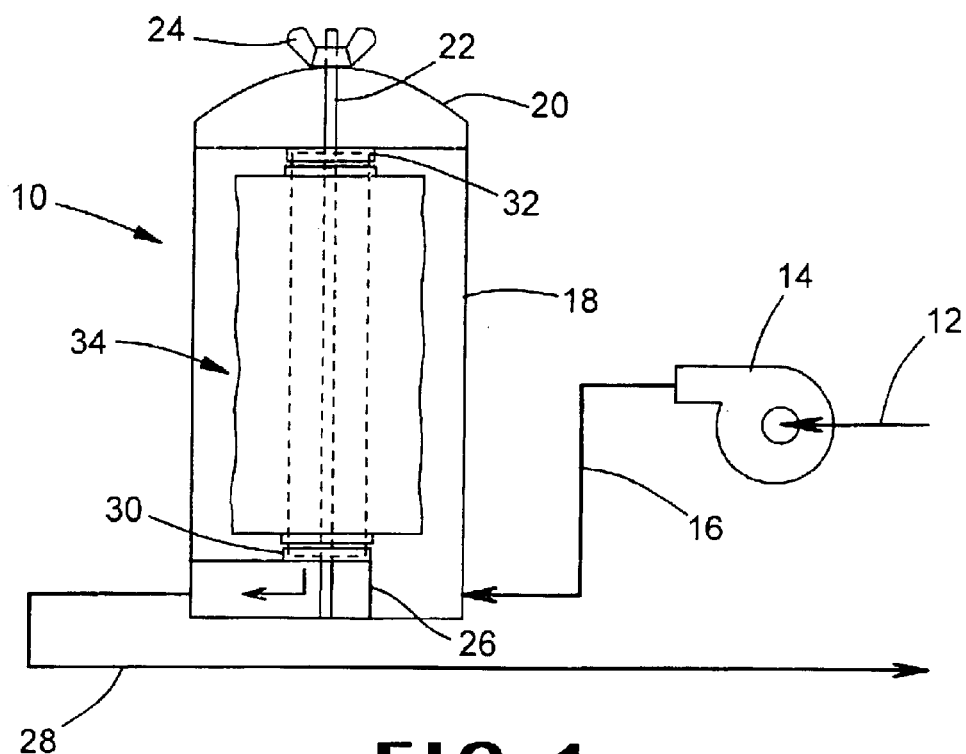
FIG. 1 is a schematic view of a recirculating system for fluid from a body of fluid or swimming pool, schematically showing a recirculating pump, a canister or receptacle, and a filter cartridge in accordance with the invention.

Referring to FIG. 1, a receptacle or canister 10 is employed in a recirculating and filtering system. The system includes an intake line 12 connecting a swimming pool or other body of water (not shown) to the inlet of a recirculating pump 14. The outlet of the pump 14 is connected by a line 16 to a lower portion of a cylindrical wall 18 of the canister 10. The canister 10 further includes a top 20 held on the upper edge of the cylindrical wall 18 by a threaded shank 22 and a thumb screw 24. A lower compartment 26 of the canister 10 communicates with a recirculating line 28. The compartment 26 has a recess or receptor 30 with a corresponding recess or repector 32 located at the center of the canister top 20.

Water from the pool is supplied through the line 16 to the interior of the canister 10 and flows through a filtering cartridge 34. The filtered water is then received in the compartment 26 from the cartridge and supplied through the line 28 back to the pool.

Figure 2:
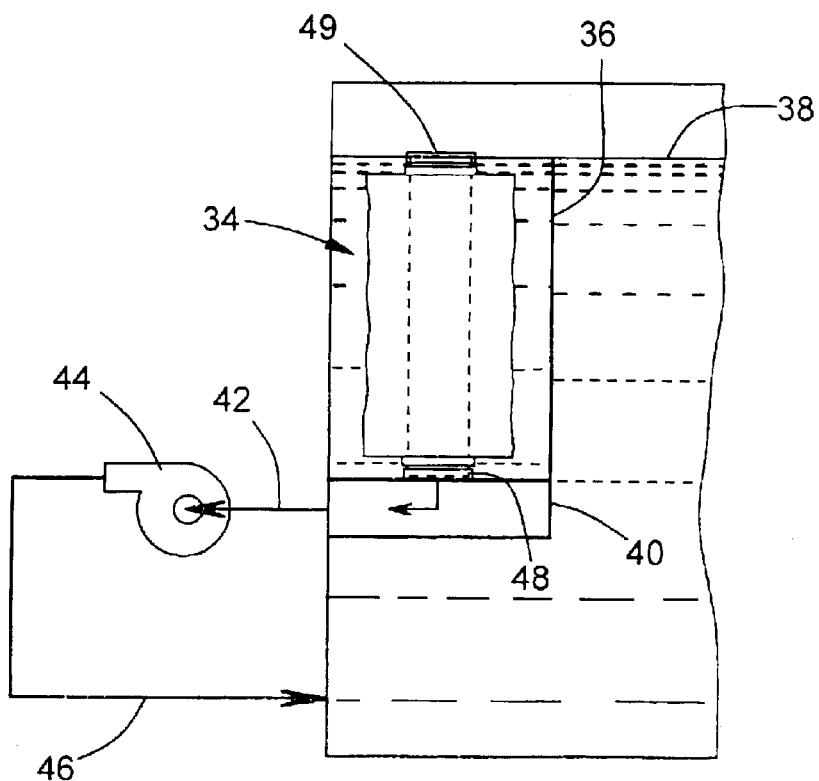
FIG. 2 is a schematic view of a body of fluid with a recirculating pump, a receptacle, and a slightly modified filter cartridge according to the invention.

Referring to FIG. 2, an open receptacle 36 is located in a pool or body 38 of water. The water flows over the top of the receptacle 36, through the filter cartridge 34, and to a lower compartment 40 of the receptacle 36. The water is then supplied through a line 42 to the intake of the recirculating pump 44 and to a line 46 back to the pool 38.

The cartridge 34 is similar to that of FIG. 1, with a lower end received in a recess or receptor 48 on the compartment 40, but with the top end of the filter cartridge closed off by a cap 49 in this instance.

With both the recirculating systems of FIGS. 1 and 2, the water in the receptacle or canister outside the filter cartridge 34 is under pressure higher than that in the center of the core. In one instance, the outer pressure is positive and in the other instance, the inner pressure is negative.

Figure 5:
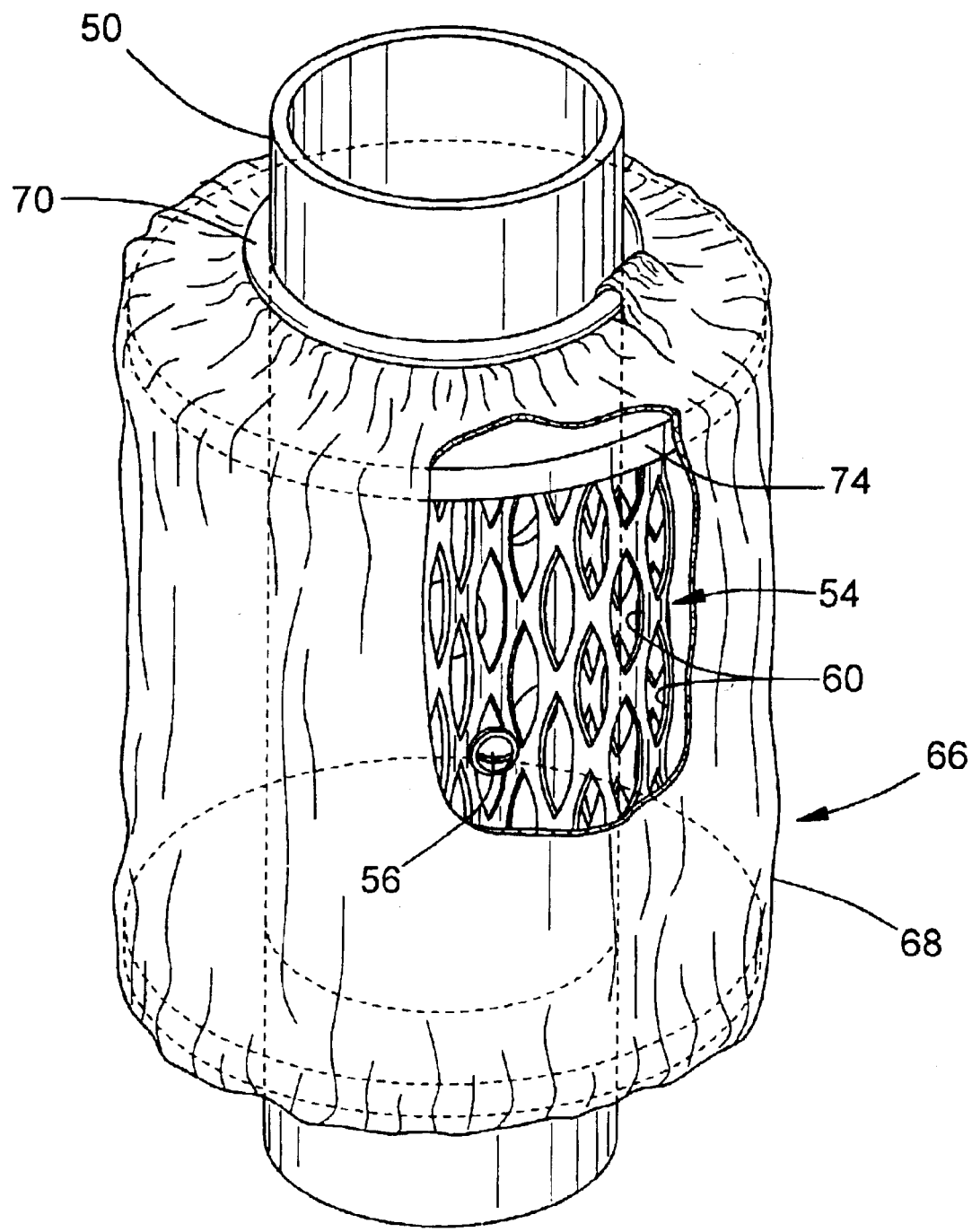
FIG. 5 is a view in perspective of the assembled filter cartridge, with parts broken away.

Referring to FIGS. 3–5, the filter cartridge 34 has a hollow member or core 50 with holes or openings 52 spaced therealong in rows. The core can be made of many suitable materials, preferably being made of plastic. It need only be available in a few sizes to accommodate most swimming pool and sauna water systems.

A pleated frame or support 54 is located around the core 50 and is functionally integral therewith. As shown, the frame 54 is attached to the core by self-tapping screws 56 with washers 58. The frame 54 is porous, having a multiplicity of openings 60 therein, with the frame being made of expanded metal, in this instance. As schematically shown in FIG. 4, the frame has an undulating contour, forming six projections or ridges 62 and six valleys 64 around the core. Other outer contours can be employed, of course, the purpose being to provide a larger filtering area for the filter cartridge 34.

A filter sleeve or tube 66 can be made of many different filter media. It includes a generally cylindrical intermediate portion 68 with the maximum dimension across the sleeve exceeding the maximum dimension across the frame 54. Circumferential end passages are formed at the ends of the sleeve 66 to receive elastic bands 70 and 72. These extend around the end portions of the core 50 to hold the ends of the sleeve 66 tightly in place on the core and around the frame 54. Annular rubber or plastic pads 74 and 76 (FIG. 3) are located around the ends of the frame 54 to protect the sleeve 66 and to block the flow of water through the ends of the frame 54 and into the holes 52 of the core 50.

The holes 52 in the core 50 are between the valleys 64 of the support 54 and underneath the ridges 62 of the support. Thus, a maximum filtering surface is presented when the water flows inwardly through the sleeve 66, the frame 54, and the holes 52, where the filtered water is then supplied from the core 50 back to the pool or other body of water.

In order to clean or replace the filter sleeve 66, the filter cartridge 34 is removed from the receptacle 10 or 36, the ends of the core 50 being separted from the receptors 30, 32 or 46. The filter sleeve 66 is then separated from the core and frame by stretching the band 70 up and over the end of the core 50, with the other band 72 being similarly manipulated to then simply slide the sleeve 66 off the frame 54. The bands 70 and 72 are pulled outwardly from the sleeve, twisted one hundred eighty degrees (see FIG. 3) and then stretched over the corresponding ends of the core 50 to re-install the sleeve.

The sleeve 66 can be cleaned simply by spraying with a garden hose to flush away dirt and grime. Such cleaning typically is done about every two weeks. From time-to-time when the filter sleeve is to be replaced, it is only a fraction of the cost of a conventional filter cartridge, typically being one-fourth the cost. Further, retailers can reduce their inventory substantially, opening their shelf space and reducing customer complaints. The central core is designed to last four to five times that of a standard cartridge insert, greatly reducing the disposable products consumed. The effect to the consumer is not only cost and time saving, but also environmental compatibility.

The frame 52 can have more or less than six of the projections 62 and valleys 64, depending on the size of the filter cartridge and the application.

The separate annular pads 74 can be a permanent part of the core 50 by using a plastic-like material that will cover the ends of the expanded metal frame 54 by dip-coating to protect the sleeve 66 from tearing.

The recirculating and filtering systems of FIGS. 1 and 2 are for illustration, of course, and many other types of canisters, receptacles, etc. can be employed.

Various modifications of the above described embodiments of the invention will be apparent to those skilled in the art, and it is to be understood that such modifications can be made without departing from the scope of the invention, if they are within the spirit and the tenor of the accompanying claims.

We claim:

1. A core assembly for a filter cartridge for a filtering system communicating with a pump, said assembly comprising a core, said core having openings therein, a porous frame of expanded metal attached to said core and extending therearound, said porous frame forming projections and valleys extending around said core, and a flexible sleeve-like filter member supported around said core, said filter member being larger in diameter than said core, whereby said filter member conforms to the projections and valleys of said porous frame when pressure is applied to said member, said flexible sleeve-like filter member having elastic bands around end openings therein to attach said filter member around end portions of said core beyond said frame.

2. A core assembly, according to claim 1 characterized by annular pads around ends of said porous frame between said porous frame and said member.

3. A filter system for filtering impurities and the like from a pool of water comprising receptacle means for containing water from the pool, means for supplying water from said receptacle means to the pool, a core having a hollow interior communicating with said supplying means, said core having a plurality of openings therein communicating with the exterior of said core, a rigid support functionally integral with said core and extending around and along said core, said support having openings therein and projections extending therealong, a flexible sleeve having openings at ends thereof, and elastic endless bands around both of said openings of said flexible sleeve, said elastic bands being of sufficient length at both ends of said sleeve openings to extend circumferentially around said core to hold the ends of said sleeve in contact with said core by drawing in said ends of said sleeve around said core beyond said support.

4. A filter system according to claim 3 characterized by said core being made of expanded metal.

\* \* \* \* \*